Dec. 19, 1944.   A. U. BRYANT   2,365,172
FLUID FLOW CONTROLLER
Filed Jan. 25, 1943
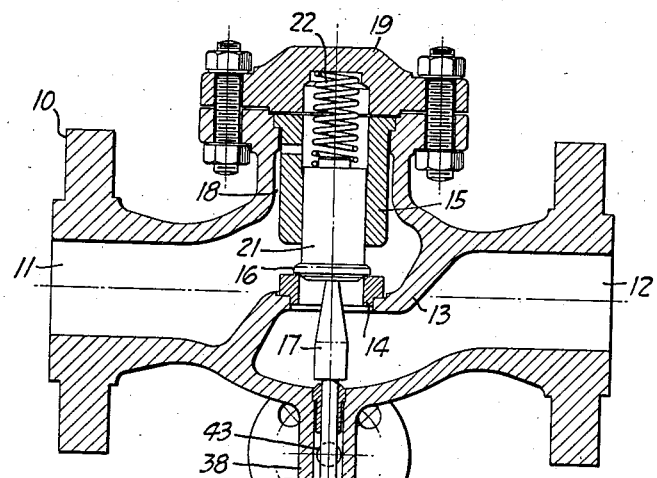
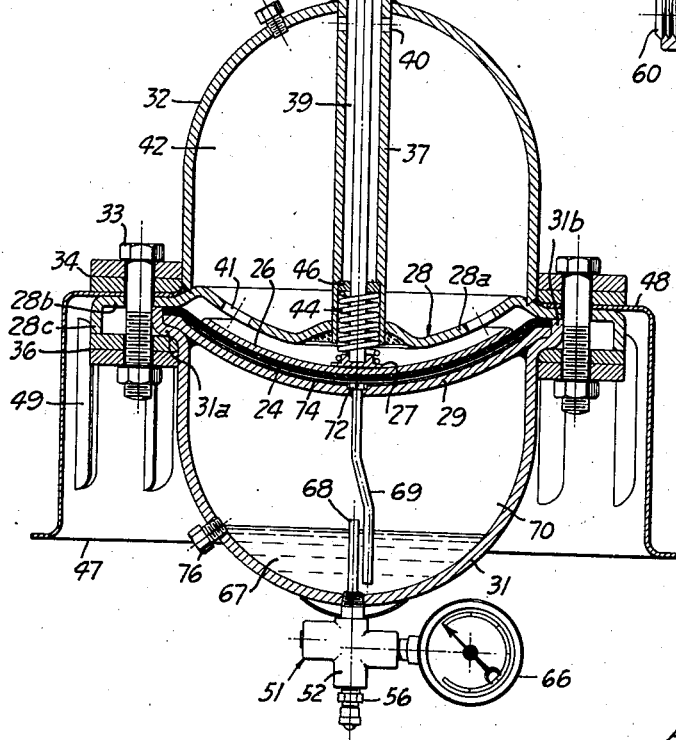
INVENTOR.
Austin U. Bryant
BY
Paul D. Flehr
ATTORNEY.

Patented Dec. 19, 1944

2,365,172

UNITED STATES PATENT OFFICE 2,265,172

FLUID FLOW CONTROLLER

Austin U. Bryant, Berkeley, Calif., assignor to Fluid Control Engineering Co., a copartnership consisting of Marvin H. Grove and Julia E. Grove, both of Piedmont, Calif.

Application January 25, 1943, Serial No. 473,454

3 Claims. (Cl. 50—22)

This invention relates generally to fluid flow control devices and is adapted particularly for the control of steam over a relatively wide pressure range.

In Patent No. 2,264,306, there is disclosed a pressure reducing regulator capable of handling steam at relatively high pressures, and in which the diaphragm for operating the valve member is loaded by air or like gas under pressure. The space on the upper side of the diaphragm is connected to the outflow side of the regulator, and a column of condensate is maintained over the diaphragm for its protection. Pumping action of the diaphragm, which tends to disrupt the column of condensate, is prevented by means of a baffle which extends in close proximity with the lower side of the diaphragm. The baffle has a small orifice establishing communication between the confined space below the diaphragm and a larger space below the baffle which contains the loading gas under pressure.

In many installations the regulator of Patent 2,264,306 gives satisfactory operation without undue heating or deterioration of the diaphragm. However under certain conditions it has been found that the diaphragm may be subject to serious overheating with rapid deterioration, particularly where a number of pipe bends or angles may intervene between the regulator and the point at which a pressure connection is made back to the space above the diaphragm.

It is an object of the present invention to provide a controller or regulator which will avoid the above difficulty, and which will make possible operation under all conditions without overheating or rapid deterioration of the operating diaphragm.

Another object of the invention is to provide novel means for protecting a diaphragm formed of material such as natural or synthetic rubber, and which in particular tends to prevent undue oxidation at the higher temperatures.

Further objects of the invention will appear from the following description in which the preferred embodiment has been set forth in detail in conjunction with the accompanying drawing.

Referring to the drawing:

Figure 1 is a side elevational view, in cross section, illustrating a steam regulator incorporating the present invention.

Figure 2 is an enlarged cross-sectional detail showing the fitting for introducing or bleeding off loading gas.

Figure 3 is an enlarged cross-sectional detail showing the flow restricting orifice.

Figure 4 is an enlarged detail showing the upper face of the wall underlying the diaphragm.

The regulator illustrated in Figure 1 consists of a valve body 10 provided with inflow and outflow passages 11 and 12. Within the body there is a bridge 13 provided with a seat ring 14. A vertically movable valve member 16 cooperates with the seat 14 and is adapted to be moved between open and closed positions by the vertical operating rod 17.

Various means can be used to guide the valve member 16 but in this instance I provide a stationary sleeve 15 which is fitted within the opening 18 in the upper side of the valve body. Closure plate 19 is clamped to the valve body, and retains sleeve 15 in place. Cylindrical plunger 21 is loosely fitted within the sleeve 15, and has its lower end attached to or formed integral with the valve member 16. A light compression spring 22 is interposed between plate 19 and plunger 21 and serves to urge this plunger together with valve member 16 downwardly towards the seat 14.

The lower end of the operating rod 17 connects with a flexible diaphragm 24. This diaphragm is formed of suitable resilient material, such as natural or synthetic rubber, preferably with some fabric reinforcement. While a planar diaphragm can be used it is desirable to employ one molded to spherical shape as illustrated. To form a connection with rod 17 the upper side of the diaphragm is engaged by the dished diaphragm plate 26, the central portion of which has a socket-like button 27 to receive the lower end of rod 17.

The mounting for the diaphragm 24 is assembled from a number of parts including a plate 28 extending above the diaphragm, a dished plate 29 extending immediately below the diaphragm, a lower dome-like part 31, and an upper dome-shaped part 32. All of these parts can be conveniently formed of pressed sheet metal. Part 28 is annularly contoured, and has an inner portion 28a dished to conform with the curvature of the diaphragm. The flange portion 28b of this part extends beyond the periphery of the diaphragm, and has an outer downturned rim 28c. Part 31 has its upper end formed to provide the flange portion 31a, and also the upturned rim 31b which embraces the peripheral edge of the diaphragm.

Part 29 is dished or formed spherical shaped to conform with the contour of diaphragm 24, and has its peripheral edge portion seated within the rim 31b, immediately below the peripheral edge portion of the diaphragm. The parts just described are secured together by clamping bolts 33, which extend through the upper and lower clamping rings 34 and 36, and through circumferentially spaced openings in the flange portion 28b. When clamped together the peripheral edge portion of the diaphragm is slightly squeezed to provide a seal.

Part 32 has its lower edge welded or otherwise attached to the upper face of part 28. Extending downwardly through the parts 32 and 28, and secured to the same as by means of welding, there is a pipe or tube 37. The upper end of this pipe is welded or otherwise secured to an extension 38 which extends downwardly from the valve body. Tube 37 forms a passage 39 to accommodate the operating rod 17.

Part 28 is shown provided with openings 41 so that the chamber or space 42 formed by part 32, is in free communication with the space immediately overlying the diaphragm. Likewise this space is in direct communication with the passage 39 by ports 40 and can be connected to a source of controlling fluid under pressure by way of passage 43. Where the device is to be employed as an automatic pressure reducer, passage 43 is connected by a separate pipe to a point in the low pressure system where it is desired to maintain a desired pressure.

At the lower end of the operating rod 17 a light compression spring 44 can be provided to urge the diaphragm plate 26 downwardly. The lower end of this spring is shown seated upon the button 27, and the upper end is seated upon a guide 46 disposed within the lower end of the pipe 37.

As an aid in dissipating heat from the diaphragm mounting, a cylindrically shaped depending skirt 47 can be provided. The upper inturned flange 48 of this skirt can be engaged below the upper clamping rings 34. Circumferentially spaced slots 49 are provided in this skirt to permit passage of convection currents of air.

Connected to the lower mounting part 31 there is a fitting 51 for the purpose of admitting or venting off loading gas. A suitable construction for this fitting is shown in Figure 2. Briefly it consists of a body 52 having a threaded portion 53 for engaging with dome part 31. Within the central opening 54 of the body there is a small check valve assembly 56. This assembly can consist of a small fitting 57 to which a suitable pressure pump can be applied, with the inner end of this fitting provided with a cylindrical extension 58, over which a resilient rubber tube 59 is seated. The main passage 61 through fitting 57 communicates with the inner surface of sleeve 59 through a small port 62. When sufficient pressure is applied to the exterior end of the fitting 57 tube 59 is expanded to permit the air to pass through port 62 into the passage 54.

To vent off air or other gas the body 52 is threaded to accommodate the needle valve 60. By slightly opening this needle valve with respect to its seat 3, one can vent off a desired amount of compressed gas from the central passage 54. Body 52 is also shown provided with a threaded opening 64 for making connection to the pressure gauge 66.

Within the dome part 31 I normally provide a quantity of liquid or inelastic fluid 67, which can be any liquid which is stable at the operating temperatures employed, and which will have no corrosive or deleterious effect upon the associated metal and rubber parts. One liquid which I have used with good results is glycerine. Fitting 51 is provided with a tube 68 which extends to a point above the surface of liquid 67, so that gas can be introduced into or vented from the space 70 above the liquid.

Extending down into the body of liquid 67 there is a tube 69, the upper end of which is silver-soldered into an opening 71 provided in the part 29 (Fig. 3). Threaded within the upper end of this tube there is a small fitting 72, which forms a flow restricting orifice 73. It will be evident that tube 69, together with the orifice fitting 72, serves to establish communication with the space between part 29 and the lower side of the diaphragm, and the main space 70 of the dome part 31, at a point within the body of liquid 67. In place of the orifice fitting 72, the tube 69 can be made sufficiently small to provide the desired flow restriction. In order to insure flow of liquid into the space below the diaphragm, when the diaphragm flexes upwardly from a position in contact with part 29, the upper face of the latter is provided with one or more grooves 74 (Fig. 4) which connect with orifice 73. Flexing movements of the diaphragm, which necessarily occasion a change in the volumetric capacity of the space between the diaphragm and part 29, must be accompanied by a surging of the liquid through the tube 69 and the restricted orifice 73.

Operation of the device described above can be outlined as follows: It will be assumed that inflow opening 11 is connected to a high pressure steam system, and that the outflow passage 12 is connected to piping and appliances forming a low pressure steam system. Also assume that the passage 43 is connected by an extended pipe to a point in the low pressure system where it is desired to maintain a substantially constant pressure. Because of dissipation of heat from the diaphragm mounting, by radiation and convection currents of air, a column of condensate is maintained within chamber 42 and within the passage 39, and the outflow pressure is exerted through this column of condensate, on the upper side of the diaphragm 24. At the time of installation of the device no gas pressure will exist within the dome part 31. After installation and before usage, air under pressure is applied within chamber 70, through fitting 51, until a pressure is attained comparable to the pressure desired upon the outflow side of the regulator. While pressure is thus being applied, any small amount of air in tube 69 and in the space between part 29 and the diaphragm is greatly compressed and thus the liquid flows through tube 69 and occupies the major part of the space between the diaphragm and part 29. Now assuming normal operation for the device, the diaphragm assumes a position such that the flow of steam past the valve 16 is sufficient to maintain the pressure on the outflow side at the desired value. Variations in the outflow pressure transmitted to chamber 42, cause flexing of the diaphragm, to make corresponding compensating changes in the position of the valve member.

Although the loading pressure upon the diaphragm is maintained pneumatically, the restraint upon the diaphragm is hydraulic. Any flexing of the diaphragm must be accompanied by flow of liquid through tube 69 and orifice 73, with the result that relatively high restraining forces are imposed against rapid movements of the diaphragm. Therefore there is no tendency for rapid movements of the diaphragm to occur, and consequently a column of condensate is maintained at all times over the diaphragm, and the diaphragm is not subject to overheating or to rapid fluttering.

Overheating of the diaphragm and its resultant disintegration is also minimized by the fact that its lower face is in contact with the liquid, rather than air. The liquid serves more effectively to conduct away heat, and serves to prevent oxidation of the type which tends to occur when rubber is in contact with air at elevated temperatures.

Another feature of this invention is that while it serves to effectively restrain the diaphragm against rapid flexing movement in response to outflow pressure variations, there is relative freedom from hunting action. Thus when a change in pressure occurs upon the outflow side, there is responsive flexing of the diaphragm to reposition the valve member, but after the diaphragm is flexed to a position corresponding to the demand there is no continued hunting. Hunting is known to be undesirable as it tends to cause fluctuations in the outflow pressure having no specific relationship to the demand.

The body of liquid 67 can be introduced into the dome part 31, as for example by removing plug 76, either at the time the regulator is assembled at the factory, or at the time of its installation and before it has been placed in use. The quantity of liquid should be ample to occupy the space between the diaphragm 24 and wall 29, when the diaphragm is flexed upwardly, plus a sufficient excess to insure that the lower end of tube 69 is submerged at all times. At the same time the quantity of liquid should not be so great as to provide an insufficient space in the dome part 31 for the trapped air under pressure. A substantial volume of trapped air is desirable so that flexing of the diaphragm does not cause appreciable changes in the pressure of the trapped air.

The size of the orifice 73 can vary in different instances, depending upon various factors such as the conditions of operation, the size of the diaphragm, and the degree of restraint desired. For example where the regulator is designed for inflow steam pressures varying from 600 to 700 lbs. per square inch, and outflow pressures varying from 450 to 500 lbs., the orifice 73 can be of the order of from $\frac{1}{32}$ to $\frac{1}{16}$ of an inch, for diaphragms ranging from 3 to 8 inches in diameter.

Instead of utilizing a fixed or trapped quantity of compressed air in the dome part 31, it is possible to connect this dome part to a source of air at the desired pressure. In this connection it is possible to utilize an adjusting loading regulator for conveniently changing the regulator for different outflow pressures, in the manner disclosed and claimed in co-pending application Serial No. 308,622, filed Dec. 11, 1939.

I claim:

1. In a fluid flow controller, a valve body having inlet and outlet passages and a stationary valve seat, a valve member movable between open and closed positions with respect to the valve seat, a flexible diaphragm associated with the valve member and adapted when flexed between limiting positions to move the valve member between open and closed positions, means forming a fluid chamber on one side of the diaphragm and adapted to receive a controlling fluid of varying pressure, a loading dome embracing the other side of the diaphragm, a partition wall extending across said other side of the diaphragm and across that portion of the loading dome adjacent the diaphragm, said partition wall forming an enclosed space between it and the adjacent side of the diaphragm and a second enclosed space with the main part of the loading dome, the diaphragm being adapted to contact the adjacent face of the partition wall for closed position of the valve member, a body of liquid occupying part but not all of the second space, the remainder of the second space being adapted to receive a gas under pressure, a tube having its upper end communicating with the first space and having its lower end extending into said body of liquid, and a flow restricting orifice serving to restrict flow of liquid through said tube.

2. In a steam regulator, a valve body having inflow and outflow openings, a valve seat formed within the body, a valve member cooperating with the valve seat and movable in opposite directions between open and closed positions to control flow of steam through the body, a fluid pressure operated diaphragm, a mounting for said diaphragm disposed below the valve body, said mounting forming fluid chambers above and below said diaphragm, the chamber below the diaphragm being adapted to contain gas under pressure and the upper chamber being adapted to contain hot condensate, a wall extending across the lower side of the diaphragm and serving to isolate a closed space immediately below the diaphragm from the remainder of the space formed below the diaphragm by said mounting, a body of liquid occupying part but not all of said last named space, a tube having its upper end communicating with the space immediately below the diaphragm and having its lower end extending into the body of liquid, said tube and substantially all of the space between the diaphragm and said wall being filled with liquid from the body whereby liquid is in constant contact with the diaphragm, and a flow restricting orifice serving to restrict flow of liquid through said tube.

3. In a fluid flow controller, a valve body having inlet and outlet passages and a stationary valve seat, a valve member movable between open and closed positions with respect to the valve seat, a flexible diaphragm located below the valve body and connected to operate the valve member, the diaphragm when flexed between limiting positions serving to move the valve member to open and closed positions, means forming a fluid chamber on the upper side of the diaphragm and adapted to receive a controlling fluid of varying pressure, a loading dome embracing the lower side of the diaphragm, a partition wall extending across the lower side of the diaphragm and across that portion of the loading dome adjacent the diaphragm, said partition wall forming an enclosed space between the same and the adjacent lower side of the diaphragm and a second enclosed space with the main part of the loading dome, a body of liquid occupying the lower part of the second space, the remainder of the second space being adapted to receive gas under pressure, a tube having its upper end communicating with the first space and having its lower end extending into said body of liquid, a flow restricting orifice serving to restrict flow of liquid through said tube, and a second tube carried by the loading dome and having an inner open end communicating with the second space at a point near the central vertical axis of the same and above the level of the liquid, the other end of said tube being adapted to communicate with the exterior of the dome whereby gas can be introduced into or vented from said dome through said last named tube.

AUSTIN U. BRYANT.